United States Patent Office 3,013,898
Patented Dec. 19, 1961

3,013,898
COATING PAINTED SURFACES WITH A
SILICA SOL
Donald F. Dempcy, Brandywine Hundred, Del., assignor to E. I. du Pont de Nemours and Company, Wilmington, Del., a corporation of Delaware
No Drawing. Filed Sept. 19, 1958, Ser. No. 761,945
4 Claims. (Cl. 117—49)

This invention relates to improving the soil resistance of scorchable surfaces, especially painted metal, and is more particularly directed to processes in which such a surface is brought into contact with a silica sol having a pH below about 4.2, in which the silica particles are substantially discrete and in the size range of 5 to 30 millimicrons, to form a coating on the surface, and the coating is thereafter dried upon the surface.

It has already been proposed to improve the resistance of painted surfaces to soiling by coating them with a silica sol and drying. While resistance to soiling can be developed on the surface in this manner, the results have not been all that was desired because for many purposes the resultant silica coatings were not sufficiently hard or adherent. Ordinary handling of the coated articles often sufficed to abrade off or mark the silica coating, and where the silica was removed in this manner the anti-soiling characteristic was, of course, lost and marking of the article became very noticeable. Although the need for a harder and more adherent coating was realized, no feasible means for hardening the coating in a reasonable time had heretofore been available.

It has been proposed, for instance, to harden silica coatings by baking them. On scorchable surfaces, however, this idea was not practicable because the temperatures needed were so high and the times required were so long that deterioration of the scorchable surface occurred before the desired hardness had been developed.

Now according to the present invention it has been found that hard, adherent coatings of silica on scorchable surfaces, especially painted metal surfaces, can be obtained by processes comprising effecting contact of the surface with a silica sol having a pH below about 4.2, in which the colloidal particles are in the size range of 5 to 30 millimicrons and are substantially discrete, and drying the sol coating. If the original, scorchable surface had a Gardner 60° gloss rating of 5 to 85, the product of the process has increased soil resistance.

In describing the present invention the term "scorch" is used in its usual and ordinary meaning to denote heating so as to change color and texture without consuming. Surfaces which can be scorched are peculiarly amenable to treatment with silica sols by methods of the present invention. It is preferable, however, that the surface be one which can be heated to 80° C. before scorching begins.

Since the object of the treatment is to improve soil resistance, the scorchable surface must be one capable of being soil-proofed by a silica sol. This ability can be measured in terms of the Gardner gloss rating at 60°. The Gardner gloss rating should be from 5 to 85. If the surface is glossier, its soil resistance is usually high and additional soil resistance is usually not needed. On the other hand, if the 60° rating is below 5, the surface is usually so rough that little or no anti-soiling effect can be achieved with silica sols.

While many surfaces fall within the required range of gloss ratings, such as plastics, ceramic ware, and the like, it is especially preferred to apply the processes to painted metal. The problem of developing adequate hardness in silica coatings upon painted metal is especially difficult because of the tendency of the paint to scorch upon heating, and hence the advantages of the invention are especially noticeable.

Representative paints which can be applied to metals and which are benefited include alkyd-nitrogen resin base paints where nitrogen compound is urea formaldehyde and/or melamine formaldehyde, vinyl resin paints, straight alkyd paints, epoxy base paints, acrylic resin paints, and plasticized vinyl paints.

The continuous liquid phase of the silica sols used can be, at least in part, an organic liquid. Thus, organosols can be used, but they are not preferred because of the danger that the organic phase would attack the scorchable surfaces being treated. Accordingly it is preferred to use silica aquasols.

The discontinuous phase of the silica sol comprises substantially discrete particles 5 to 30 millimicrons in average dimension. If the particles are spherical, all three dimensions are equal and are the same as the average. For anisotropic particles the size is considered to be one third of the sum of the three particle dimensions. For example, an aggregate consisting of three spheres joined together in a straight line might be 30 millimicrons long but only 10 millimicrons wide and thick. The size of this particle is $$\frac{30+10+10}{3}$$

or 16.7 millimicrons

The discrete particles in the sol can consist of aggregates of ultimate particles as just noted, provided the aggregates are in the range of 5 to 30 millimicrons in size. It is far preferred, however, to use sols in which the particles are substantially discrete, dense, ultimate particles of the stated size range. The fact of whether or not a sol contains particles of the type herein described can be readily ascertained by techniques with which the art is already familiar. Thus, the size can be determined directly by electron microscope examination or can be inferred from surface area measurements. The discreteness can also be inferred from relative viscosity measurements, sols which are highly viscous being in a high degree of aggregation and hence being avoided.

Silica sols of the type here preferred are already well known in the art, being described, for example, in Bechtold et al. U.S. Patent 2,574,902, Alexander U.S. Patent 2,750,345, and Rule U.S. Patent 2,577,485. Sols prepared as described in White U.S. Patent 2,375,738, Trail U.S. Patent 2,573,743 and Legal U.S. Patent 2,724,701 can also be used provided the degree of aggregation of the particles is not so great as to place them outside the above-mentioned limitations.

The silica sol as used will have a concentration in the range of 0.5 to 25 percent $SiO_2$ by weight and preferably in the range from 1 to 15 percent.

A surface-active agent is preferably included in the silica sol. Again, those skilled in the art are familiar with surfactants which can be used with silica sols. Among the more effective surfactants are Alkanol DW-alkyl aryl sodium sulfonate, and Aerosol OT-dioctyl ester of sodium sulfosuccinic acid.

Having selected a suitable silica sol of discrete particles in the correct size range, the pH of the sol is then adjusted to a value lower than about 4.2. This can be done in various ways. For instance, stabilizing alkali present may be abstracted by passing the sol in contact with a cation-exchange resin in hydrogen form and an anion-exchange resin in hydroxyl form. This essentially deionizes the sol and causes it to have its natural pH of about 3.5. Alternatively, an acidic material such as acetic acid or hydrochloric acid can be added to lower the pH. Such sols should be used promptly after pH adjustment.

It is particularly preferred to use sols of pH lower than 4.2 in which the discrete silica particles are in the size range of about 5 to 8 millimicrons. These sols form the hardest coatings and are most effective as anti-soiling agents.

The silica sol having suitable pH is then applied to the painted surface in such a manner that the sol forms a continuous coating thereon. This is aided by heating the surface first to a temperature between 80° C. and the scorching point of the surface and applying the sol to the heated surface as described more particularly in U.S. patent application Serial No. 761,916, now abandoned, filed concurrently herewith by Charles B. Thompson.

The sol may be applied to the surface by any suitable means, such as with a transfer roll or by spraying, or the surface may be immersed in a bath of the silica sol.

The amount of sol applied should be sufficient to form a continuous coating, but if increased soil resistance is the objective, no substantial excess should be used. The proper quantity can readily be ascertained by visual observation and in any event should not be so great as to cause a noticeable whitening of the surface. Good coatings have been obtained with a deposition on the surface amounting to approximately 100 milligrams per square foot of coated surface.

The uniform sol coating is dried by conventional means. This can be accomplished, for instance, in a circulating air oven, or with radiant heat lamps, or in the case of painted metal, by induction heating.

When the treated article is to be subjected to severe conditions of abrasion, it is desirable to develop the maximum possible degree of hardness in the coating. This can be done by baking it at elevated temperature. Such baking can be a part of the drying operation just mentioned. The coating should be heated to a temperature of 121° C. or higher. Mar-resistant coatings have been obtained at this temperature and above with as little as thirty seconds exposure. In any case, the coated surface should be exposed to 121° C. as a minimum. The maximum exposure time is that which is just insufficient to scorch or discolor the paint.

The invention will be better understood by reference to the following illustrative examples.

Example 1

A colloidal silica sol was made by a process of Example 3 of Bechtold and Snyder U.S. Patent 2,574,902. It contained 30 percent silica by weight in the form of substantially discrete, dense particles having an average diameter of about 17 millimicrons. The sol had an $SiO_2:Na_2O$ ratio of about 85:1.

This sol was diluted with water to contain 10 percent $SiO_2$ by weight. Hydrochloric acid was added to reduce the pH to 3.2–3.5. To improve the wetting characteristics of the sol .25 percent by weight of Alkanol DW was mixed into the diluted sol.

A low carbon steel strip which had been painted with an alkyd-nitrogen resin paint and dried was coated with this acidified silica sol by preheating the strip to approximately 95° C. and immediately dipping it in the above sol and excess allowed to drain off. The sol-coated strip was then dried and baked at 193° C.

The silica coating obtained on the painted surface was harder and more abrasion resistant than coatings obtainable at higher pH's and the same curing temperature. It could not be scratched with the fingernail and had a hardness of from 4H to 5H as rated by attempting to scratch the coating with lead pencils of this hardness.

Example 2

The painted, low carbon steel strip used as the starting material of Example 1 was preheated to 95° C. and dipped into a solution made by diluting a colloidal silica sol prepared as described in Example 2 of Alexander Patent 2,750,345 to 8 percent $SiO_2$ by weight and acidifying with hydrochloric acid to a pH of from 3.0 to 3.5 and dissolving therein .25 percent of Aerosol OT surface-active agent. The strip was then removed and excess sol was doctored off.

The treated strip was heated to 193° C. for thirty-six seconds to dry the silica coating and harden it. A dry lubricant was applied to the treated surface.

The silica coating obtained on the strip had a hardness of 6H to 8H and could be handled through forming operations without marring.

I claim:
1. In a process for coating a scorchable surface with silica the steps comprising heating the surface to a temperature between 80° C. and its scorching point, bringing the surface while so heated into contact with a silica sol having a pH below about 4.2, the silica particles in the sol being substantially discrete and in the size range of 5 to 30 millimicrons, to form a coating on the surface, and drying said coating upon the surface, and baking the dried coating at a temperature between 121° C. and the scorching point of the surface.

2. A process of claim 1 in which the silica sol applied to the surface contains a wetting agent.

3. In a process for coating painted metal with silica, the steps comprising heating the painted metal to a temperature between 80° C. and its scorching point, bringing the painted surface while so heated into contact with a silica sol having a pH below about 4.2, the silica particles in the sol being substantially discrete and in the size range of 5 to 30 millimicrons, to form a coating on the surface, and drying said coating upon the surface, and baking the dried coating at a temperature between 121° C. and the scorching point of the paint on the metal.

4. A method of treating a strip of painted metal to impart resistance to permanent soiling thereto which comprises heating said strip to a temperature of at least approximately 120° F. and yet not high enough to discolor the painted surface, applying an aqueous colloidal dispersion of silica to said strip while in the heated state to form a wet coating thereon, heating said wet coated strip to a surface temperature of above approximately 250° F. and yet not high enough to discolor the painted surface, and the said aqueous colloidal dispersion having a pH of less than 5 and the silica particles therein have an average diameter of about 10 millimicrons.

References Cited in the file of this patent
UNITED STATES PATENTS

| | | |
|---|---|---|
| 2,526,684 | Powers et al. | Oct. 24, 1950 |
| 2,661,438 | Shand | Dec. 1, 1953 |
| 2,734,834 | Florio | Feb. 4, 1956 |
| 2,763,569 | Bradstreet et al. | Sept. 18, 1956 |
| 2,787,968 | Luvisi | Apr. 9, 1957 |
| 2,801,938 | Iler | Aug. 6, 1957 |